3,085,888
ZIRCONIUM BORIDE-SILICIDE BODIES AND
METHODS OF MAKING SAME
Peter T. B. Shaffer, Niagara Falls, N.Y., assignor to The
Carborundum Company, Niagara Falls, N.Y., a corporation of Delaware
No Drawing. Filed Feb. 11, 1960, Ser. No. 7,997
19 Claims. (Cl. 106—57)

This invention relates to novel refractory compositions and to articles and shapes made therefrom. It also pertains to methods for making said compositions, articles, and shapes.

There is a strong, continuing demand for new and better refractory compositions, articles and shapes that will stand up under ever increasing and exacting demands with respect to strength, hardness, density, resistance to oxidation at high temperatures and to other forms of corrosion and erosion, resistance to thermal shock, and other conditions that bring about the deterioration and failure of conventional refractory bodies.

The excellent refractory characteristics of many zirconium compounds has created a considerable interest in the application of such compounds for refractory purposes. Several of the properties of zirconium diboride make it a desirable candidate for a super refractory material. It has a high melting point, on the order of about 3040° C. (5472° F.), a low thermal expansion coefficient ($5.5 \times 10^{-6}$ per ° C.), and good strength. Unfortunately, these desirable characteristics are somewhat offset by its rather high oxidation rate, especially at very high temperatures, such as those above 1500° C. (2732° F.).

The pursuit of improved refractory bodies has also led to attempts to impart oxidation resistance to refractories by impregnation with molybdenum silicide. However, at high temperatures, above about 800° C. (1472° F.), such an impregnated refractory evolves gaseous molybdenum oxide. The rate of evolution is extreme above 1800° C. (3272° F.). The interstitial molybdenum silicide, in bodies of this type, is usually present as a surface film or coating that acts as a barrier and prevents or retards contact with oxygen. When the molybdenum silicide is decomposed and molybdenum oxide forms, the molybdenum oxide appears to bubble off, at extremely high temperatures, through the glassy coating of molybdenum silicide, breaking the coating and thus to some extent diminishing its usefulness in further protecting the body against oxidation. Moreover, the oxide $MoO_3$ is characterized by a heavy metal content that would interfere with radar and similar electronic systems.

One object of the present invention is to provide new refractory compositions that have highly satisfactory properties with respect to strength, hardness, density, resistance to oxidation and other forms of corrosion and erosion, resistance to thermal shock, and resistance to other conditions that bring about deterioration and failure of more conventional refractories, and which thereby offer many advantages in various fields of use where a material or body of marked refractory properties and characteristics of hardness and density are required.

Another object of the invention is to provide a new refractory composition of the character described, that has superior resistance to oxidation after prolonged exposure in air or in an oxidizing atmosphere at extremely high temperatures, particularly at temperatures in excess of 3500° F.

Another object of the invention is to provide a refractory material of the character described that is further characterized by dimensional stability over a wide range of temperatures.

Another object of the invention is to provide a self-bonded refractory body that can be used at high temperatures in conjunction with radar and other electronic systems, without the danger of the evolution of heavy metal-containing substances that might interfere with the radar or other electronic device.

Other objects of the invention will be apparent hereinafter from the specification and from the recital of the appended claims.

I have found that refractory bodies of the desired characteristics can be obtained by bonding together, as for example by hot pressing, an intimate mixture of finely divided particles of zirconium boride and a zirconium silicide.

In practicing the invention, according to one preferred embodiment thereof, in which hot pressed bodies are formed, zirconium diboride, preferably of high purity, in finely divided form, is mixed with a finely divided zirconium silicide, and the mixture is ball milled to form an intimate admixture of these two substances in which the particle size is about 300 mesh (that is, about 50 microns and finer). Many of the several known zirconium silicides and mixtures thereof can be employed, including for example, $Zr_6Si_5$, $Zr_4Si$, $Zr_5Si_3$, $Zr_2Si$, $Zr_3Si_2$, $Zr_4Si_3$, $ZrSi$, and $ZrSi_2$. In order that the silicide have a sufficiently high melting point, the zirconium silicide, or mixture of silicides, that is employed, should have a silicon content of about 5% to about 40% by weight, and preferably, of about 7.5% to about 25% by weight.

It is not completely clear to those skilled in the art just what form of interaction or union occurs between zirconium and silicon. One theory that has been advanced is that coordination compounds are formed, in which the zirconium atoms form coordination compounds with the silicon atoms. The formulae for various zirconium silicides, that are mentioned herein, have been proposed by workers in this art. However, it is recognized that in zirconium-silicon combinations where the proportions are not such as to give rise to one particular silicide, a mixture of two or more silicides may exist.

Since there is probably no hard and fast line of distinction, chemically, between a particular silicon-zirconium combination in the proper proportions such that a chemical formula can be employed to designate the respective proportions, and a similar combination that is not however in such proportions and therefore cannot be described by a single chemical formula with integral numerals as subscripts, but that can however be described (whether factually or not) as a mixture of two silicides of different formulae, it will be understood that any identification of a zirconium silicide herein by a chemical formula should be considered as designating a silicon-zirconium chemical combination that contains these two respective elements in the approximate proportions designated by the formula. The use of a formula herein therefore should not be construed as limiting the description to a specific chemical compound in the sense of classical chemistry. Rather the formula designates the relative proportions of the ingredients present, although in many cases it may be true that a compound of the indicated formula exists and actually does constitute the major proportion of the chemical combination thus identified.

Although somewhat similar considerations apply to compositions of zirconium and boron, zirconium diboride is considered by many authorities to be a true chemical compound. If one element or the other is present in excess, however, in a chemical combination of the two, it is believed that a continuous series of solid solutions is obtained, except in the proportions where other true chemical compounds are formed. This invention is primarily concerned with zirconium diboride.

According to the invention, then, an intimate mixture of zirconium boride and zirconium silicide is sintered or pressed in a hot-pressing furnace, preferably in an inert or reducing atmosphere. Furnaces of this type commonly produce pressures ranging from 500 to 10,000 p.s.i. The upper pressure limit usually is fixed by the strength of the mold. In practicing the present invention, pressures on the order of 1,000 to 2,000 p.s.i. are preferred, but pressure does not appear to be a critical factor other than as necessary to obtain compaction, and both higher and lower pressures can be employed.

To obtain dense bodies, it is necessary to continue the pressing at an elevated temperature for a somewhat prolonged period. For example, small bodies can be formed at pressures in the preferred range of 1,000 p.s.i. to 2,000 p.s.i. by maintaining the mix under pressure at a temperature on the order of 2,000° C. (3632° F.) for about one hour. Bodies that are produced according to the present invention often have a density that is 98% to 99% of the theoretical density, but in order to obtain this density, the pressure and temperature must be maintained until no further densification is obtained. In many cases, for example, in pressing small test bodies at 2000° C. (3632° F.) and 2,000 p.s.i., after 30 minutes at pressing temperature and pressure, densification is still occurring. The high temperature and prolonged residence in the furnace appear to be necessary to permit the silicide to soften and flow. At pressing temperatures below about 1900° C., desirable densities are not usually obtained. Temperatures above about 1950° C. (3540° F.) are preferred for hot-pressing a mixture in which the major component is zirconium diboride, and the preferred hot-pressing temperature is about 2100° C. (3812° F.).

Microscopic examination of the cross-section of a typical hot-pressed body indicated that the particle size of the largest particle of silicide, within the field inspected, was about 40 microns. The silicide particles appear as inclusions within the major phase of zirconium diboride. At the surface, after the bodies have been exposed to the atmosphere at an elevated temperature, a coating of silica appears to form, which probably serves the function of retarding the contact between air or oxygen and the zirconium diboride.

The porosity and apparent grain size differs widely between specimens that are hot-pressed from different compositions. The specimens made in accordance with the invention, that have the greatest resistance to oxidation, are those of the composition (in mol percentages) 95% zirconium diboride, 5% pentazirconium trisilicide, and that are characterized by considerable porosity. The effect of porosity is an apparent anomaly.

The following specific examples illustrate more clearly the exact manner in which the present invention can be carried out. The invention is not to be construed as being limited to the particular proportions set forth in the examples. The percentages given, unless otherwise specified, are mol percentages.

EXAMPLE 1

*99% Zirconium Diboride—1% Pentazirconium Trisilicide*

A mixture was made of granular zirconium diboride and pentazirconium trisilicide, the latter being present in sufficient quantity to comprise 1% of the mixture. As will be understood, the term "pentazirconium trisilicide" is employed to designate a chemical combination of zirconium and silicon, in which the relative proportions are such that there are approximately five mols of zirconium for three mols of silicon. The quoted term does not necessarily designate a chemical compound although there is some reason to believe that such a compound may exist. If the compound does exist, however, it nevertheless will be understood that this example is not intended to describe the use of that compound alone; chemical combinations of zirconium and silicon in the approximate proportions stated may equally well be used for present purposes.

The mixture was ball milled to reduce the size of substantially all of the particles to below about 40 microns in their largest dimension. Shapes were then hot-pressed from this mixture at 1000 p.s.i., at a pressing temperature of 2000° C. (3632° F.), and the pressure and temperature were maintained for one hour. During the hot-pressing and the subsequent cooling a stream of argon was passed into the furnace.

To provide a basis for comparison, shapes were hot-pressed from substantially pure zirconium diboride having the same fine particle size, under the same hot-pressing conditions. The zirconium diboride bodies had an average density of 5.58 gm./cc., which is 91.5% of theoretical. Microscopic examination revealed that the zirconium diboride body had a very fine porous structure.

The shapes made in accordance with this invention had an average density of 5.24 gm./cc., which is 86.0% of the theoretical density. Examination under a microscope revealed a structure in which the pore sizes were noticeably somewhat larger than those in the shapes made from pure zirconium diboride.

Specimens were taken for oxidation testing, by removing from the shapes by grinding any portions of the shapes that bore evidence of reaction with the graphite of the hot-pressing mold. The shapes, from which the specimens were taken, were then diamond-sawed into samples for testing. This procedure permitted study of the specimens in their dense form, uncontaminated by foreign materials.

In preparation for testing the resistance to oxidation of the specimens, the specimens were carefully weighed and measured, and then were supported across a pair of triangular prisms of zirconia in such a way that the specimens made contact with the zirconia prisms only along two sharp edges. This procedure permitted the specimens to be removed easily from their supports after oxidation, with little chance of damage. This procedure also minimized the possibility that the specimens would sinter to the supports at the extremely high testing temperatures.

The supported specimens were placed in an oxidation furnace at the desired test temperature. After the specimens reached the test temperature, they were held at test temperature for a period of one hour. After removal from the furnace, the specimens were permitted to cool in air, and then were reweighed and remeasured. Following these measurements, the specimens were mounted in clear plastic, and then cut across a cross-section parallel to the vertical axis of the test furnace. The weight change of the specimens, expressed in milligrams per square centimeter of specimen area per unit time, provided a criterion for the evaluation of oxidation resistance. The thickness, adherence and regularity of the oxidized zones of the specimens, as revealed by examination of the cross-sections of the specimens, provided another and probably a more meaningful criterion for evaluation.

Comparative oxidation testing was performed with specimens that were made of hot-pressed pure zirconium diboride and specimens of a hot-pressed mixture as described above, at temperatures of 1500° C. (2732° F.), and at 1850° C. (3362° F.). By the criteria described above, the bodies that contained pentazirconium trisilicide exhibited a retarded oxidation rate. A study of the sections of the oxidized specimens under a microscope indicated the formation of a more adherent oxide layer on the specimens containing the trisilicide. Further studies indicated that the silica, that was formed as a coating on the surface of the specimens, adhered very tightly and in addition caused any zirconia that formed, also to adhere tightly, so that where zirconia formation did occur, the zirconia did not spall off as in the case of pure diboride specimens.

Other specimens were hot-pressed under the same conditions from the same compositions, respectively. The zirconium diboride bodies had an average density of 5.66 gm./cc., or 93.0% of theoretical. The 99% zirconium diboride—1% pentazirconium trisilicide bodies had an average density of 5.27 gm./cc., or 86.4% of theoretical. Oxidation testing at 1850° C. (3362° F.) for 1 hour demonstrated the superior resistance to oxidation at this temperature of the composite bodies.

EXAMPLE 2

*95% Zirconium Diboride—5% Pentazirconium Trisilicide*

Following generally the procedure of Example 1, but adjusting the proportions of the raw batch mixture to contain 5 percent of pentazirconium trisilicide, additional shapes were hot-presssed. These shapes had an average density of 4.78 gm./cc. Specimens were taken from these shapes, and oxidation tests were performed substantially in the manner described in Example 1, at 1500° C. (2732° F.) for one hour. Additional shapes were hot-pressed from another raw batch of substantially the same composition. The average density of the shapes was 4.83 gm./cc., or 79.3% of theoretical. Specimens were oxidation tested for one hour at 1850° C. (3362° F.).

As compared to specimens made from pure zirconium diboride, it was clear that the presence of the pentazirconium trisilicide retarded oxidation of the diboride and assisted in the formation of a more adherent oxide layer, particularly in the temperature range of 1500° C.–1850° C. (2732° F.–3362° F.).

To provide a further basis for comparison with the properties of bodies made from pure hot-pressed zirconium diboride, additional specimens, having an average density of 4.75 gm./cc., or 78.0% of theoretical, were subjected to oxidation for one hour at 1950° C. (3540° F.). At this higher temperature, the rate of oxidation of the pure diboride specimens increased drastically, whereas the rate of oxidation of the specimens containing 5 percent of this silicide increased only slightly.

EXAMPLE 3

*90% Zirconium Diboride—10% Pentazirconium Trisilicide*

To demonstrate the effect of the addition of a larger amount of the pentazirconium trisilicide, a raw batch mixture was prepared in accordance with the procedure of Example 1, that contained 10 percent of the pentazirconium trisilicide. Shapes were hot-pressed from this mixture in accordance with the hot-pressing procedure described in Example 1. The average density of the shapes was 5.22 gm./cc., which is 85.6% of the theoretical density.

Oxidation testing of these specimens at 1500° C. (2732° F.) for one hour indicated that the addition of the larger amount of the silicide definitely retards the oxidation rate so that it is better than that of a hot-pressed body made from pure zirconium diboride.

Other specimens of the same composition, were hot-pressed to a density of 5.23 gm./cc., or 85.9% of theoretical. Oxidation testing for one hour, at 1850° C. (3362° F.), demonstrated the improved resistance to oxidation of these specimens.

Other specimens, of the same composition, were hot-pressed to a density of 5.09 gm./cc., or 83.5% of theoretical. Oxidation testing for one hour, at 1950° C. (3542° F.), demonstrated the improved resistance to oxidation of the specimens.

EXAMPLE 4

*Further Comparative Testing*

To provide a further basis for comparison, a body was formed by hot-pressing substantially pure zirconium diboride for one hour at 2000° C. (3632° F.) at 1000 p.s.i.

Specimens prepared as in Examples 2 and 3, and having densities of 4.75 gm./cc. and 5.09 gm./cc., respectively were also selected.

The three types of specimens were subjected to comparative oxidation testing in the oxidation furnace, by holding the bodies at 1950° C. (3542° F.) for one hour. The bodies that contained the pentazirconium trisilicide exhibited a definitely retarded oxidation rate.

Many comparative observations have clearly demonstrated the superiority of the composite zirconium diboride body, containing pentazirconium trisilicide, over the pure hot-pressed zirconium diboride body, as to oxidation resistance. The increased oxidation resistance is particularly marked at temperatures of 1850° C. (3360° F.) and above. Moreover, the hot-pressed bodies of this invention compare favorably in oxidation resistance, as well as in other desirable properties, with other refractory materials that have been subjected to comparative testing.

The specimens that are described herein were prepared from reactor grade zirconium compounds. Zirconium compounds usually contain the same concentration of hafnium that existed in the ores from which the zirconium was derived, which usually is in the range of 0.5 part to 2.0 parts by weight of hafnium per 100 parts by weight of the combined metals zirconium and hafnium. Reactor grade zirconium and zirconium compounds, however, are substantially free of hafnium. This invention applies equally to bodies made of the pure, reactor grade zirconium compounds, of industrial grade zirconium compounds, and of hafnium compounds. In addition, hafnium silicide can be employed as the additive particulate material that is combined with the zirconium boride in the raw batch mix from which the hot-pressed bodies are prepared, to impart oxidation resistance to the zirconium boride. Moreover, the use of the zirconium and hafnium silicides, to impart oxidation resistance to the zirconium boride, has equal applicability to all of the zirconium borides, including, for example, zirconium monoboride, zirconium diboride, and zirconium dodecaboride.

Specimens made with silicides other than the trisilicide of the examples, such as, for example, $Zr_6Si_5$, $Zr_4Si$, $Zr_2Si$, $Zr_3Si_2$, $Zr_4Si_3$, $ZrSi$ and $ZrSi_2$, demonstrate comparable improvements in oxidation resistance as compared to the pure boride.

The exact relative proportions of zirconium diboride and zirconium silicide, that are employed in preparing the raw batch composition to be hot-pressed to form a desired shape, ordinarily will be selected in each case for the particular characteristics that are required for the application at hand. In general, however, the raw batch mix may contain up to 10 mol percent, or about 35% by weight based on the mixture, of the zirconium silicide, for optimum results in improving oxidation resistance. The addition of larger amounts of the comparatively low-melting silicide begins to have a definitely adverse effect on the oxidation rate; at least 1 weight percent should be used for any substantial improvement in properties; and amounts between 5 mol percent and 10 mol percent provide good results.

Bodies can be made in accordance with this invention by standard fabrication techniques for ceramics. Sintering with no external applied pressure, occurs in a narrow range. For making precision bodies, hot pressed bodies can be ground to desired final dimensions.

It is to be understood that the products of the present invention in its various modifications are not limited to any specific field or fields of use. The products can be made in substantially any desired shape. They are, therefore, particularly suited for applications in and around high temperature equipment. They are well adapted for particularly high temperature applications, such as, for example, combustion chambers, linings for exhaust nozzles, turbine blades, stator blades, lens fusion blocks, and the like. They are also suitable for the fabrications of laboratory ware, including combustion boats, crucibles, burner holders, and other shapes.

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A body consisting essentially of a self-bonded intimate admixture of particulate zirconium boride and a silicide selected from the group consisting of zirconium silicide, hafnium silicide, and mixtures thereof, the silicide amounting to from about 1% by weight to about 35% by weight of the mixture.

2. A body consisting essentially of a self-bonded intimate admixture of zirconium boride and zirconium silicide, the silicide amounting to from about 1% by weight to about 35% by weight of the mixture.

3. A new article of manufacture consisting essentially of a substantially uniform self-bonded mixture of granular zirconium boride and granular zirconium silicide, the silicide amounting to from about 1% by weight to about 35% by weight of the mixture.

4. As a new article of manufacture, a refractory body consisting essentially of a self-bonded mixture of granular zirconium boride and granular zirconium silicide, the zirconium silicide being present in said body from about 1% by weight up to about 35% by weight of said body.

5. As a new article of manufacture, a self-bonded body of a mixture consisting essentially of a zirconium silicide containing from about 5% by weight up to about 40% by weight of silicon, and zirconium diboride, the zirconium silicide being present in said article from about 1% by weight up to about 35% by weight thereof.

6. As a new article of manufacture, a hot-pressed body of a substantially uniform self-bonded admixture consisting essentially of a zirconium silicide containing from about 7.5% by weight up to about 25% by weight of silicon, and zirconium diboride, the zirconium silicide being present in said article from about 1% to about 35% by weight thereof.

7. As a new article of manufacture, a self-bonded body of a substantially uniform admixture consisting essentially of zirconium diboride and a combination of zirconium and silicon in approximately the proper relative proportions for designation in chemical compound nomenclature as pentazirconium trisilicide, the pentazirconium trisilicide being present in said article from about 1% by weight up to about 35% by weight thereof.

8. As a new article of manufacture, a self-bonded body of a substantially uniform admixture consisting essentially of zirconium diboride and a combination of zirconium and silicon in approximately the proper relative proportions for designation in chemical compound nomenclature as tetrazicronium monosilicide, the monosilicide being present in said article from about 1% by weight up to about 35% by weight thereof.

9. As a new article of manufacture, a self-bonded body of a substantially uniform admixture consisting essentially of zirconium diboride and a combination of zirconium and silicon in approximately the proper relative proportions for designation in chemical compound nomenclature as zirconium disilicide, said disilicide being present in said article from about 1% by weight up to about 35% by weight thereof.

10. A method of making a refractory body comprising preparing a shape from a raw batch mixture consisting essentially of zirconium boride and a silicide selected from the group consisting of zirconium silicide, hafnium silicide, and mixtures thereof, and in which the silicide is present in the range from about 1% by weight to about 35% by weight of said raw batch mixture, and heating the shape at a temperature of at least about 1900° C. to bond it together.

11. A method of making a refractory body comprising preparing a raw batch mixture consisting essentially of zirconium boride and a silicide selected from the group consisting of zirconium silicide, hafnium silicide, and mixtures thereof, and in which the silicide is present in the range from about 1% by weight to about 35% by weight of said raw batch mixture, placing the raw batch mixture in a mold, and hot-pressing said raw batch mixture at a pressure of at least about 500 p.s.i., and at a temperature of at least 1900° C. to bond it together.

12. A method of making a refractory body comprising preparing an intimate admixture of finely divided particles of zirconium boride and zirconium silicide, and in which the zirconium silicide is present in the range from about 1% by weight to about 35% by weight of said mixture, placing the mixture in a mold, and hot-pressing said mixture at a pressure of at least about 500 p.s.i., and at a temperature of at least about 1900° C. to bond it together.

13. A method of making a refractory body comprising preparing a shape of an intimate admixture of finely divided particles of a zirconium silicide containing from about 5% by weight up to about 40% by weight of silicon, and zirconium boride, and in which the silicide is present in the range from about 1% by weight to about 35% by weight of said mixture, and heating the shape at a temperature of at least about 1900° C. to bond it together.

14. A method of making a refractory body comprising preparing an intimate admixture of finely divided particles consisting essentially of a zirconium silicide containing from about 7.5% by weight up to about 25% by weight of silicon, and zirconium diboride, and in which the silicide is present in the range from about 1% by weight to about 35% by weight of said mixture, placing the mixture in a mold, and hot-pressing said mixture at a pressure of at least about 500 p.s.i. and at a temperature of at least about 1900° C. to bond it together.

15. A method of making a refractory body comprising preparing an intimate admixture of finely divided particles consisting essentially of a zirconium silicide containing from about 7.5% by weight up to about 25% by weight of silicon, and zirconium boride, and in which the silicide is present in the range from about 1% by weight to about 35% by weight of said mixture, placing the mixture in a mold, and hot-pressing said mixture at a pressure of at least about 500 p.s.i., and at a temperature of at least about 1900° C. to permit the boride to bond, and for a sufficient time to raise the temperature of the boride so that it will bond.

16. A method of making a refractory body comprising preparing an intimate admixture of finely divided particles, whose major dimension predominantly is about 50 microns and less, consisting essentially of a zirconium silicide containing from about 7.5% by weight up to about 25% by weight of silicon, and zirconium diboride, and in which the silicide is present in the range from about 1% by weight to about 35% by weight of said mixture, placing the mixture in a mold, and hot-pressing said mixture at a pressure of at least about 500 p.s.i., and at a temperature of at least about 1900° C. to permit the boride to bond, and for a sufficient time to raise the temperature of the boride so that it will bond, in an inert atmosphere.

17. A method of making a refractory body comprising preparing an intimate admixture of finely divided particles consisting essentially of zirconium diboride and a combination of zirconium and silicon in approximately the proper relative proportions for designation in chemical compound nomenclature as pentazirconium trisilicide, said trisilicide being present in said mixture from about 1% by weight up to about 35% by weight thereof, placing the mixture in a mold, and hot-pressing said mixture at a pressure of at least about 500 p.s.i. and at a temperature of at least about 1900° C. and for a sufficient time so that said boride will bond.

18. A method of making a refractory body comprising preparing an intimate admixture of finely divided particles consisting essentially of zirconium diboride and a combination of zirconium and silicon in approximately the proper relative proportions for designation in chemical compound nomenclature as tetrazirconium monosilicide, said monosilicide being present in said mixture from about 1% by weight up to about 35% by weight thereof, placing the mixture in a mold, and hot pressing said mixture at a pressure of at least about 500 p.s.i. and at a temperature of at least about 1900° C. and for a sufficient time so that said boride will bond.

19. A method of making a refractory body comprising preparing an intimate admixture of finely divided particles consisting essentially of zirconium diboride and a combination of zirconium and silicon in approximately the proper relative proportions for designation in chemical compound nomenclature as dizirconium monosilicide, said monosilicide being present in said mixture from about 1% by weight up to about 35% by weight thereof, placing the mixture in a mold, and hot-pressing said mixture at a pressure of at least about 500 p.s.i. and at a temperature of at least about 1900° C. and for a sufficient time so that said boride will bond.

References Cited in the file of this patent

UNITED STATES PATENTS 2,982,619    Long     May 2, 1961

FOREIGN PATENTS 478,016    Great Britain     Jan. 11, 1938
712,585    Great Britain     July 28, 1954